Jan. 30, 1934.  H. HOLZWARTH  1,944,892
EXPLOSION TURBINE PLANT
Filed July 18, 1931

Inventor
HANS HOLZWARTH
BY Joseph Hirschman
ATTORNEY

Patented Jan. 30, 1934

1,944,892

UNITED STATES PATENT OFFICE 1,944,892

EXPLOSION TURBINE PLANT

Hans Holzwarth, Dusseldorf, Germany, assignor to Holzwarth Gas Turbine Company, San Francisco, Calif., a corporation of Delaware Application July 18, 1931, Serial No. 551,810, and in Germany July 26, 1930

5 Claims. (Cl. 60—49)

My invention relates to explosion turbine plants wherein combustion gases are periodically generated in constant volume explosion chambers and then discharged intermittently against a velocity or impulse rotor, after which they are employed to drive one or more continuous current gas turbines; and particularly to an explosion turbine plant of this type wherein steam is generated, and preferably also superheated, with heat obtained from the combustion gases, and wherein the output of the explosion turbine rotor is utilized solely to drive the compressor which furnishes compressed air to the explosion chambers, while the available output of the plant is developed by continuous current gas and steam turbines.

In the construction of explosion turbine plants of the type above referred to, it has heretofore seemed to be the better practice to avoid utilizing the heat content of high pressure, high temperature combustion gases at poor efficiency by transferring the heat of the partially exhausted gases directly to liquid water for the generation of steam. The heat of the exhaust gases was therefore employed in the valuable high temperature range for the superheating of steam, while for steam generation only the heat abstracted by the cooling medium of the explosion turbine was used.

The present invention is based upon the discovery that in explosion turbine plants composed of an explosion turbine and one or more continuous current turbines utilizing the exhaust gases of the explosion turbine, the combustion gases in advance of or between the continuous current turbines still possess so high a heat content at the temperature range to which they have been reduced by the work they have done in the explosion turbine, that an economical generation of steam is possible in spite of the fact that there can be withdrawn from them, for example, in the explosion turbine, so much energy that the explosion turbine takes up the whole load of the compressor, at the same time the generation of steam to such a degree is made possible that overloads can readily be taken care of; and when, for example, a power plant of this type is embodied in a locomotive, the total tractive power, particularly upon starting, can be developed easily by the continuous current gas and steam turbines. According to the invention, therefore, heat from the exhaust gases in addition to the heat abstracted in the cooling of the explosion turbine is utilized for the generation of steam in gas turbine plants which include an explosion turbine and one or more continuous current turbines.

My invention embodies also the further discovery that the heat content of the exhaust gases makes possible, in addition to the generation of additional steam, also the superheating of all of the steam generated with the waste heat of the turbine. In order to enable the superheating to be accomplished at the highest possible temperatures, the gases discharging from the explosion turbine are caused first to superheat all of the generated steam, after which they are utilized to generate steam from water, preferably preheated, such steam forming part of that which is superheated by the gases directly as they discharge from the explosion turbine. The preheating of the feed-water can be accomplished in various ways; for example, by means of the exhaust gases discharged by the continuous current gas turbine or turbines. The waste or tapped steam of the steam section of the plant can be utilized in a similar manner.

For a better understanding of my invention reference is had to the accompanying drawing which shows by way of example an embodiment of the invention in a locomotive power plant. In said drawing, Fig. 1 shows an elevation, partly in section, of my improved plant;

Figure 2:
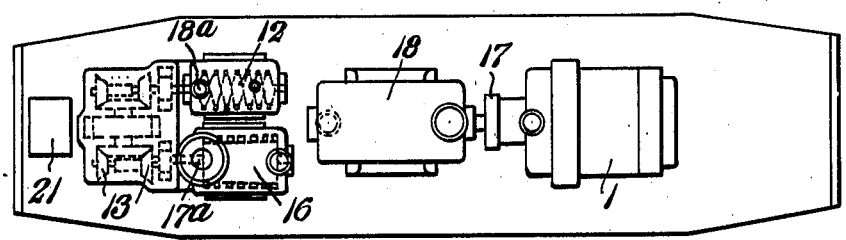
Fig. 2 is a plan of some of the parts of the plant.
Figure 1:
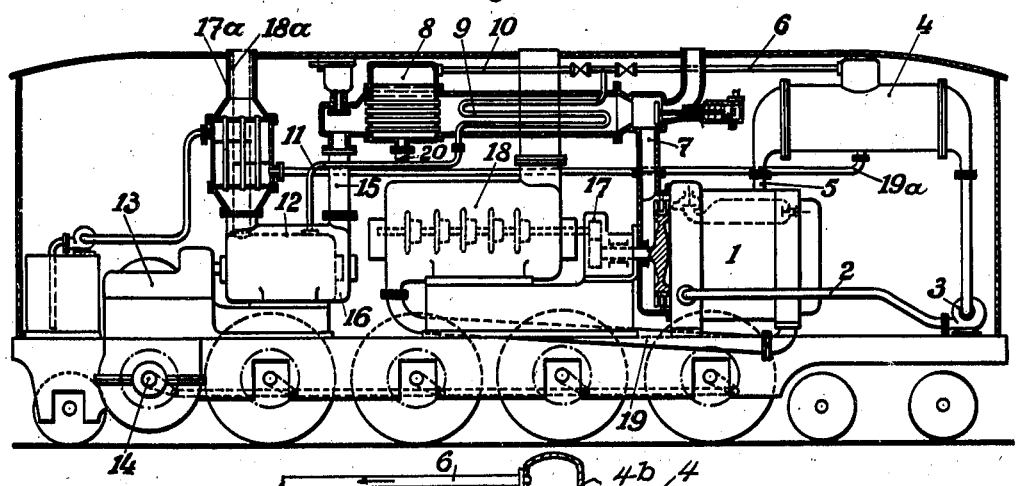
Figure 3:
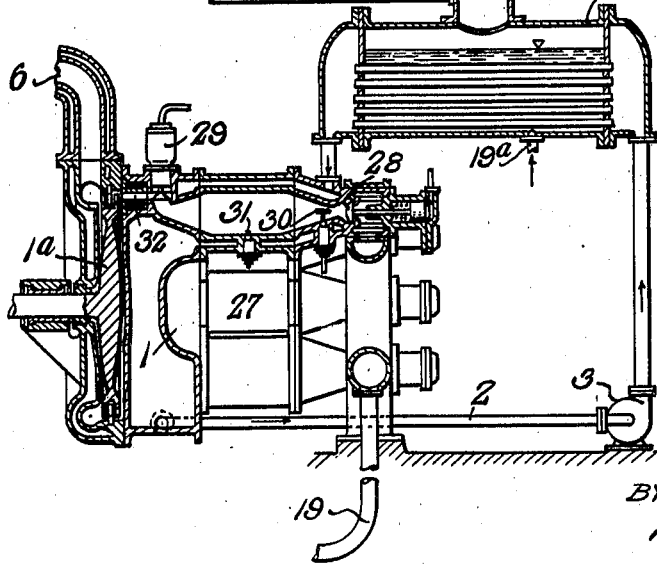
Fig. 3 is an enlarged section through the explosion turbine and the associated waste heat boiler.

The numeral 1 indicates an explosion turbine which is cooled in any suitable manner, the heat so abstracted by the cooling agent being utilized for the generation of steam. For example, all of the parts of the turbine to be cooled, including the walls of the combustion chambers, may be swept by a moving film of oil which abstracts heat from the heated parts of the turbine, such heated parts being jacketed, as shown at 26 (Fig. 3). The heated cooling oil is collected by the pipe 2 and is forced by a rotary pump 3 into the oil heated boiler 4. The latter is advantageously constructed as a transverse current cooler, and in it the cooling oil, which enters the same at about 265° C., gives up its heat to feed-water which has been preferably preheated, and then flows, after being cooled to about 230° C., back to the cooling jackets of the explosion turbine through the conduit 5.

As shown in Fig. 3, the explosion turbine comprises an impulse rotor 1a and a plurality of constant volume explosion chambers 27, such chambers being each provided with a hydraulically operated air valve 28 and an outlet or nozzle valve 29. These valves are operated at the proper instants by a hydraulic controller of any suitable construction (see for example my United States Patents Nos. 877,194 and 1,763,154). As these controllers form no part of the present invention they need not be described in detail.

Fuel is periodically introduced into each of the chambers by a fuel nozzle 30, and at the proper instant, all of the valves being closed, the explosive mixture in a chamber is ignited by a spark plug 31 or other suitable ignition device. The outlet valve 29 is then opened and the gases are discharged through an expansion nozzle 32 against the rotor 1a, the gases being expanded in the nozzle 32 to a pressure considerably (several atmospheres) above atmospheric.

By the recooling of the cooling oil in the oil heated boiler 4, steam of about 20 atmospheres is generated, such steam being drawn off by conduit 6. According to the present invention there is utilized, in addition to the heat withdrawn by the cooling agent of the explosion turbine, also the heat of the exhaust gases for generating additional steam. I accordingly provide a steam boiler 8 in the path of the exhaust gases which leave the explosion turbine through conduit 7, such boiler being likewise fed with feed water, which has been preheated in any suitable manner as described below. As I have found that the heat content of the exhaust gases is sufficiently great, in spite of its initial deenergization in the explosion turbine, and in spite of the generation of steam thereby, for superheating the generated steam, I insert a superheater 9 in the path of the exhaust gases which superheats both the steam charged by the conduit 6 from the oil-heated boiler 4 and the steam fed by the conduit 10 leading from the auxiliary steam boiler 8. The superheated steam is conveyed to a steam turbine 12 by a conduit 11, the power generated by such steam being transmitted by through transmission gearing shown diagrammatically at 13 to the blind shaft 14 and from the latter to the driving wheels of the locomotive which are coupled therewith.

The exhaust gases of the explosion turbine 1, after giving up steam generating heat and superheating heat in the boiler and heat exchangers 8 and 9, are conducted by conduit 15 to a continuous current gas turbine 16 which likewise transmits power to the driving wheels of the locomotive through the transmission 13 and the blind shaft 14. The explosion turbine 1, on the other hand, transmits power exclusively to the compressor 18 through the gearing 17. The charging air is fed to the chambers of the explosion turbine 1 by the pipe 19. The completely spent gases exhausting from the turbine 16 are discharged through conduit 17a into the atmosphere while the exhaust steam of the turbine 12 flows off through the pipe 18a. A heat exchanger 25 for preheating the feed-water may be arranged in either the conduit 17a or 18a, such preheater being shown in the illustrated embodiment of the invention in the exhaust conduit 17a, such feed-water being supplied from a tank 21 and conduit 22 by a pump 23 through conduit 24, the heated water being conducted to the heat exchangers 4 and 8 through the connections 19a and 20.

As shown in the drawing, the auxiliary steam boiler 8 is arranged in the path of the gases to the rear of the superheater 9. This arrangement embodies my discovery that the capacities of the steam turbine 12 and of the continuous current gas turbine 16 correspond with the required power output of the locomotive, particularly on starting, in spite of the fact that the combustion gases have already developed in the explosion turbine 1 the power necessary for driving the compressor 18 and in the exchangers 9 and 8 superheat all of the generated steam and produce the required additional steam. In the arrangement illustrated, therefore, the temperature range of the combustion gases has been so reduced by the initial deenergization of the gases in the explosion turbine 1 and by withdrawal of superheating heat in the exchanger 9, that an economical generation of steam takes place in the auxiliary boiler 8 without the residual working capacity of the gases which are still to be utilized in the turbine 16 being caused to fall below the degree at which they can develop the necessary part of the locomotive power output.

I claim:

1. An explosion turbine plant comprising an explosion turbine including a plurality of constant volume explosion chambers adapted to be periodically charged with an explosive mixture for explosion therein, an expansion nozzle wherein the intermittent puffs of explosion gases are expanded to a pressure considerably above atmospheric, and an impulse rotor arranged to be driven by the puffs of gases discharged by said nozzles; a continuous current gas turbine; steam generating apparatus heated by the exhaust gases and by the heat abstracted from the explosion turbine for cooling the same; and a steam superheater; means for conveying to the latter the steam generated in said apparatus; a conduit for conducting the exhaust gases of the explosion turbine to said superheater; a second conduit for conducting the gases to part of the steam generating apparatus; and a third conduit for conducting the thus cooled gases to the continuous current gas turbine.

2. An explosion turbine plant as set forth in claim 1 including a feed water heater arranged in the path of the gases exhausting from the continuous current turbine.

3. An explosion turbine plant comprising an explosion turbine including a plurality of explosion chambers adapted to be periodically charged with an explosive mixture for explosion therein, an expansion nozzle wherein the intermittent puffs of explosion gases are expanded to a pressure considerably above atmospheric, and an impulse rotor arranged to be driven by the puffs of gases discharged by said nozzles, said explosion turbine provided with cooling jackets; a conduit for charging a cooling agent into the latter; a steam generator; a conduit for charging thereinto the heated cooling agent for producing steam therein, with the heat absorbed by said cooling agent; an additional turbine stage; a gas conduit for leading the gases exhausting from said impulse rotor to said additional turbine stage; a steam superheater within said last-mentioned conduit; an auxiliary steam boiler also arranged in the path of the gases between said impulse rotor and the additional turbine stage, the auxiliary boiler being arranged beyond said superheater in the direction of the flow of the gases; and a conduit for conducting the generated steam into said superheater.

4. An explosion turbine plant as set forth in claim 3 wherein said auxiliary steam boiler and said steam superheater are constructed as a single unit.

5. The method of utilizing the energy of successive puffs of high pressure, high temperature explosion gases generated in a constant volume explosion chamber by explosion of compressed air and fuel, which comprises partially expanding such gases against a substantially constant back-pressure which is considerably above atmospheric and thereby converting the part of their energy corresponding to their upper pressure range into kinetic energy, converting such kinetic energy into mechanical energy and utilizing the latter to produce the compressed air required for generating such gases, so that the air is compressed with energy liberated by the expansion of each puff of gas from its explosion pressure down to the back pressure, cooling said explosion chamber and utilizing the heat so abstracted to generate steam, superheating said steam, and also the additional steam generated as specified hereinbelow, with the partially exhausted gases to cool the latter, then generating additional steam with the so-cooled gases and thereby still further cooling the same, and finally utilizing the gases in a continuous stream and also the superheated steam for producing available power, whereby the energy of the gases corresponding to the upper pressure range serves to compress air for the subsequent explosions, while the energy corresponding to the lower pressure range yields the available power output of the gases.

HANS HOLZWARTH.